(12) United States Patent
Gazzillo

(10) Patent No.: US 9,189,464 B2
(45) Date of Patent: Nov. 17, 2015

(54) METHOD AND SYSTEM FOR XML MULTI-TRANSFORM

(75) Inventor: Paul Gazzillo, Titusville, NJ (US)

(73) Assignee: Educational Testing Service, Princeton, NJ (US)

( * ) Notice: Subject to any disclaimer, the term of this patent is extended or adjusted under 35 U.S.C. 154(b) by 1950 days.

(21) Appl. No.: 11/862,962

(22) Filed: Sep. 27, 2007

(65) Prior Publication Data

US 2008/0077856 A1   Mar. 27, 2008

Related U.S. Application Data

(60) Provisional application No. 60/827,111, filed on Sep. 27, 2006.

(51) Int. Cl.
*G06F 17/00* (2006.01)
*G06F 17/22* (2006.01)
*G06F 17/30* (2006.01)

(52) U.S. Cl.
CPC ........ *G06F 17/227* (2013.01); *G06F 17/30914* (2013.01); *G06F 17/2247* (2013.01)

(58) Field of Classification Search
CPC ............ G06F 17/30914; G06F 17/227; G06F 17/2247
USPC .................. 715/200, 234, 239, 209, 249, 255
See application file for complete search history.

(56) References Cited

U.S. PATENT DOCUMENTS

| | | | |
|---|---|---|---|
| 6,978,271 B1 * | 12/2005 | Hoffman et al. ...................... | 1/1 |
| 2001/0051049 A1 * | 12/2001 | Horiguchi ..................... | 396/535 |
| 2002/0010715 A1 * | 1/2002 | Chinn et al. ................... | 707/514 |
| 2003/0097637 A1 * | 5/2003 | Tozawa et al. ................ | 715/513 |
| 2003/0154444 A1 * | 8/2003 | Tozawa et al. ................ | 715/513 |
| 2004/0168119 A1 * | 8/2004 | Liu et al. ..................... | 715/501.1 |
| 2004/0205653 A1 * | 10/2004 | Hadfield et al. .............. | 715/530 |
| 2004/0268238 A1 | 12/2004 | Liu et al. | |
| 2005/0050066 A1 * | 3/2005 | Hughes .......................... | 707/100 |
| 2006/0004747 A1 * | 1/2006 | Weare ............................ | 707/5 |
| 2006/0161841 A1 * | 7/2006 | Horiuchi et al. .............. | 715/513 |

(Continued)

FOREIGN PATENT DOCUMENTS

| | | | |
|---|---|---|---|
| JP | 2005242669 A | * | 9/2005 |
| WO | 2004017230 | | 2/2004 |

OTHER PUBLICATIONS

Official English Translation of JP 2005242669A, Translated Jan. 2011, p. 1-34.*

(Continued)

*Primary Examiner* — William Bashore
*Assistant Examiner* — David Faber
(74) *Attorney, Agent, or Firm* — Jones Day

(57) ABSTRACT

A method of performing XSLT processing is disclosed. The method involves defining a binary tree, each node representing either an XML document or XSLT stylesheet, each leaf representing a an existing file, and each non-leaf node having two child nodes, one representing an XML document, and one representing an XSLT stylesheet, performing a post-order traversal of the binary tree, each non-leaf node being constructed by transforming the non-leaf node's respective XML document child node using the non-leaf node's respective XSLT stylesheet to create the non-leaf node, and creating a final text document as the root node.

10 Claims, 3 Drawing Sheets

(56) References Cited

U.S. PATENT DOCUMENTS

2007/0061713 A1* 3/2007 Chidlovskii et al. .......... 715/523
2008/0120608 A1* 5/2008 Shetty et al. .................. 717/144

OTHER PUBLICATIONS

Akbani, Mohammed Ali, "Binary Tree Structure (preorder, inorder, postorder)", Aug. 4, 2001, Planet Source Code, 8 pages total.*

Cprogramming.com Tutorial, "Binary Trees: Part 1", online as of Oct. 31, 2005, Cprogramming.com, p. 1-4.*
International Search Report of PCT Application No. PCT/US2007/079743, Nov. 2007, 3 pages.
Walsh N., et al., "XML Pipeline Definition Language Version 1.0", W3C Note, [Online] Feb. 28, 2002, pp. 1-21, XP002460302, Retrieved from the Internet: <URL: http://www.w3.orgITRIxml-pipeline/>, [Retrieved on Apr. 16, 2008].

* cited by examiner

METHOD AND SYSTEM FOR XML MULTI-TRANSFORM

REFERENCE TO RELATED APPLICATIONS

This application claims priority to U.S. Provisional Patent Application No. 60/827,111, filed Sep. 27, 2006, and entitled "XML Multi-Transform."

BACKGROUND

The extensible markup language (XML) is a general purpose markup language. Extensible stylesheet language (XSL) transformation (XSLT) is a language that translates one XML document into another XML document, allowing for chained translations. XSLT is itself an XML document and may be generated from another XSLT transformation. Current extensible stylesheet language (XSL) transformation (XSLT) processing is limited to one extensible markup language (XML) document processed by one XSLT document. In general, custom applications are required in order to perform multiple transformations of XML when multiple translations need to be performed. These custom applications tend to be relatively complex, relative expensive, and have long development cycles.

Thus, there is a need for a method and system of XSLT processing that is not limited to a single XML document processed by a single XSLT document.

SUMMARY

Before the present methods are described, it is to be understood that this invention is not limited to the particular methodologies or protocols described, as these may vary. It is also to be understood that the terminology used herein is for the purpose of describing particular embodiments only, and is not intended to limit the scope of the present disclosure, which will be limited only by the appended claims.

It must be noted that as used herein and in the appended claims, the singular forms "a," "an," and "the" include plural reference unless the context clearly dictates otherwise. Thus, for example, reference to a "transaction" is a reference to one or more transactions and equivalents thereof known to those skilled in the art, and so forth. Unless defined otherwise, all technical and scientific terms used herein have the same meanings as commonly understood by one of ordinary skill in the art. Although any methods and materials similar or equivalent to those described herein can be used in the practice or testing of the present invention, the preferred methods, devices, and materials are now described. All publications mentioned herein are incorporated herein by reference. Nothing herein is to be construed as an admission that the invention is not entitled to antedate such disclosure by virtue of prior invention.

In an embodiment, a method of performing XSLT processing is hereinafter disclosed. The method comprises defining a binary tree, each node representing either an XML document or XSLT stylesheet, each leaf representing a an existing file, and each non-leaf node having two child nodes, one representing an XML document, and one representing an XSLT stylesheet, performing a post-order traversal of the binary tree, each non-leaf node being constructed by transforming the non-leaf node's respective XML document child node using the non-leaf node's respective XSLT stylesheet to create the non-leaf node, and creating a final text document as the root node.

BRIEF DESCRIPTION OF THE DRAWINGS

Aspects, features, benefits and advantages of the present invention will be apparent with regard to the following description and accompanying drawings, of which.

DETAILED DESCRIPTION

Figure 1:
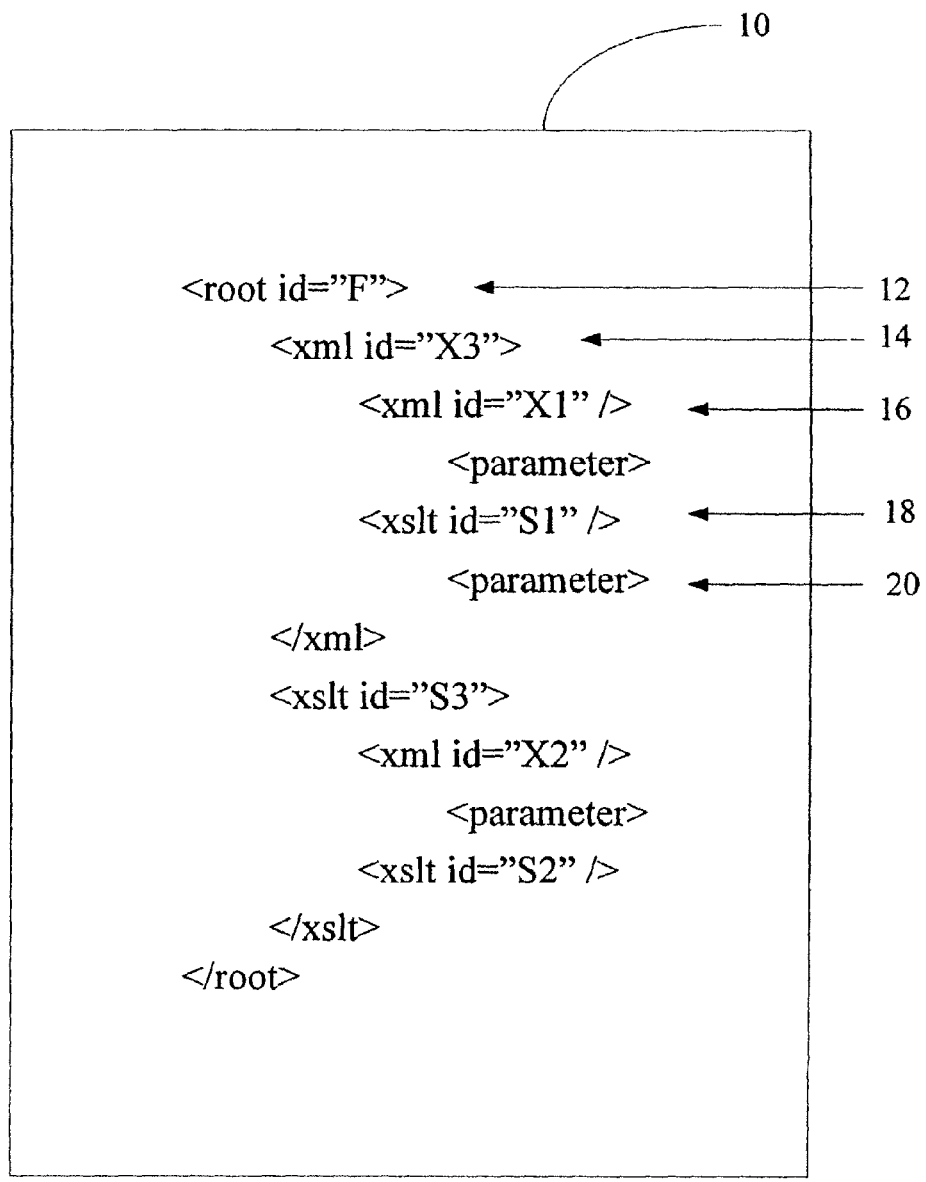
FIG. 1 depicts an exemplary data structure according to an embodiment

FIG. 1 illustrates various embodiments of a data structure 10 for representing multiple nested XSL transforms as a binary tree. The binary tree may be represented in an XML format with a schema comprising a root tag 12, and four additional tags under the root tag 12. The four tags comprise a transform tag 14, an XML tag 16, and XSL tag 18, and a parameter tag 20. The transform tag 14 may hold one XML tag 16, one XSL tag 18, and any number of parameter tags 20. Each XML tag 14 may specify either a file (i.e., a leaf node) or may have a transform tag 14 underneath it. Similarly, each XSL tag 16 may specify either a file (i.e., a leaf node) or may have a transform tag 14 underneath it. The transform tags 14 underneath the XML tag 16 may comprise XML tags 16 and/or XSL tags 18.

Figure 2:
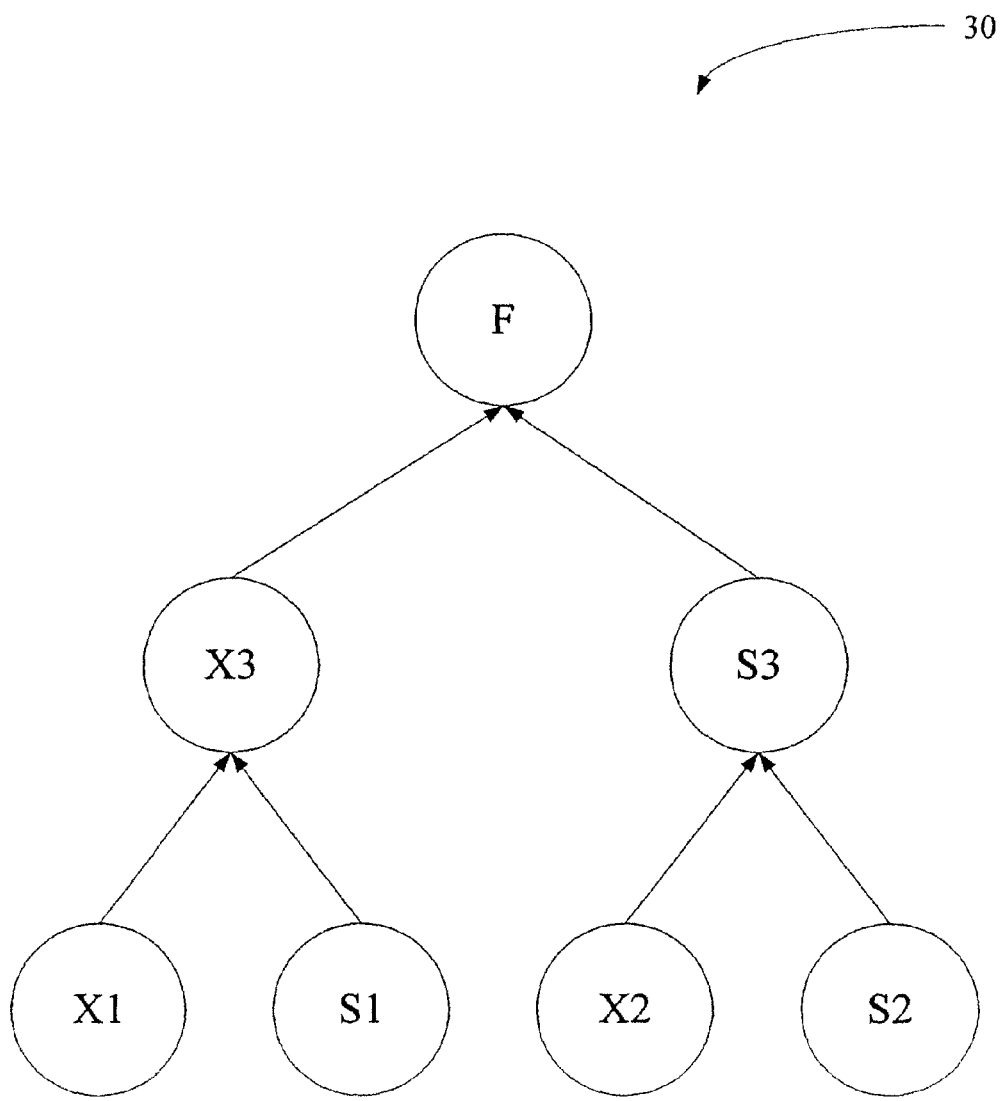
FIG. 2 depicts an exemplary binary tree corresponding to the data structure of FIG. 1 according to a preferred embodiment.

The data structure 10 may represent any number of chained or piped XSLT transformations in a declarative fashion as a binary tree comprising interconnected nodes. In a preferred embodiment, for a given parent node, one child may be an XML document, one child may be an XSLT sheet, and the parent node maybe a resultant XML document or XSLT sheet. The parent node can then itself be an XML child node or an XSLT child node of another parent node. Nodes without children may be considered leaf nodes. The only node without a parent is the top node, and may be considered the root node of the binary tree. Each node may have one or two children. Before the commencement of the method disclosed hereinafter, only the leaf nodes are guaranteed to exist at the beginning of the disclosed method. The intermediate files may be created on-the-fly, as hereinafter disclosed. The data structure 10 makes processing large numbers of XML documents more convenient. A simplified example of a binary tree 30 corresponding to the data structure 10 of FIG. 1 is illustrated in FIG. 2. In the binary tree 30, each "X" represent an XML document, each "S" represents an XSLT stylesheet, and "F" represents the final text document.

Figure 3:
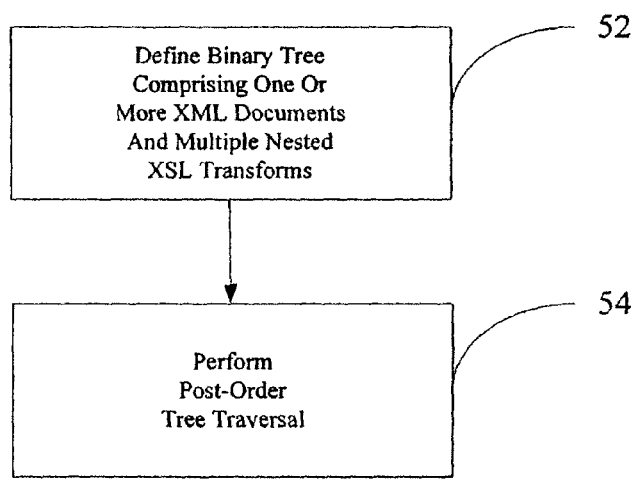
FIG. 3 depicts a flow diagram for an exemplary method of processing XML utilizing XSLT according to an embodiment.

FIG. 3 illustrates a method of XML processing using XSLT according to a preferred embodiment. In general, the method may be used for any application in which XML processing with XSLT may be useful. For example, the method may be used for report generation, data manipulation, graphics, web page generation, etc. First, a binary tree comprising one or more XML documents and multiple nest XSL transforms is defined at step 52. According to an embodiment, the binary tree may be defined using a structure similar to the data structure of FIG. 1. Then, XML document and XSL sheet transformations are performed at step with a post-order tree traversal to generate a final text document at the root node of the binary node. In the post-order tree traversal, one of the chained or piped XSLT transforms operates on an XML document to generate a different XML document or XSLT transform, and so on throughout the post-order tree traversal process. Any number of transformations may be performed to generate the final text document.

Using the binary tree 30 as an example, the post-order tree traversal proceeds as follows. First, the left child "X1" is operated on by the right child "S1" to generate the parent "X3." Then, the left child "X2" is operated on by the right child "S2" to generate the parent "S3." Then, "X3" is operated on by "S3" to produce the final text document, "F."

The above method may be implemented in, for example, hardware or firmware. The method may be implemented as a software application using any programming language and may be embodied permanently or temporarily in any type of machine, component, physical or virtual equipment, storage medium, or propagated signal capable of delivering instructions. The software code may be stored on a computer readable medium such as magnetic or optical memory devices, such as diskettes, compacts disks of both read-only and writeable varieties, optical disk drives, and hard disk drives.

It will be appreciated that various of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the disclosed embodiments.

The invention claimed is:

1. A method for generating a document using XSLT processing, the method comprising:
    obtaining a definition of a binary tree that comprises leaf nodes and non-leaf nodes, each leaf node being a node without any child node, and each non-leaf node having a pair of child nodes, each child node being either a leaf node or a non-leaf node, a child node that is a leaf node representing an existing XML document or an existing XSL document, and a child node that is a non-leaf node representing an intermediate XML document or an intermediate XSL document that is to be generated based on the non-leaf node's pair of child nodes, wherein each pair of child nodes includes a first child node representing an existing XML document or an intermediate XML document and a second child node representing an existing XSL document or an intermediate XSL document;
    performing a post-order traversal of the binary tree with a computer, said post-order traversal including
        identifying a given pair of child nodes that are leaf nodes,
        retrieving an existing XML document and an existing XSL document corresponding to the identified given pair of child nodes,
        generating an intermediate document by transforming the existing XML document using the existing XSL document, wherein the generated intermediate document is an intermediate XML document or an intermediate XSL document represented by a given parent non-leaf node of the identified given pair of child nodes,
        if the generated intermediate document is an intermediate XML document, transforming the generated intermediate document using a second existing XSL document or a second generated intermediate XSL document represented by a sibling node of the given parent non-leaf node, and
        if the generated intermediate document is an intermediate XSL document, using the generated intermediate document to transform a second existing XML document or a second generated intermediate XML document represented by a sibling node of the given parent non-leaf node; and
    generating a final document with the computer based on said post-order traversal of the binary tree.

2. The method of claim 1, wherein the binary tree is represented using an XML format.

3. The method of claim 1, wherein the final document is a report.

4. The method of claim 1, wherein the final document is a web page.

5. The method of claim 1, wherein the intermediate document is generated on-the-fly during said post-order traversal.

6. A non-transitory computer readable medium comprising instructions for causing a computer to perform XSLT processing, the instructions when executed causing a computer to:
    obtain a definition of a binary tree that comprises leaf nodes and non-leaf nodes, each leaf node being a node without any child node, and each non-leaf node having a pair of child nodes, each child node being either a leaf node or a non-leaf node, a child node that is a leaf node representing an existing XML document or an existing XSL document, and a child node that is a non-leaf node representing an intermediate XML document or an intermediate XSL document that is to be generated based on the non-leaf node's pair of child nodes, wherein each pair of child nodes includes a first child node representing an existing XML document or an intermediate XML document and a second child node representing an existing XSL document or an intermediate XSL document;
    perform a post-order traversal of the binary tree with a computer, said post-order traversal including instructions that when executed cause the computer to
        identify a given pair of child nodes that are leaf nodes,
        retrieve an existing XML document and an existing XSL document corresponding to the identified given pair of child nodes,
        generate an intermediate document by transforming the existing XML document using the existing XSL document, wherein the generated intermediate document is an intermediate XML document or an intermediate XSL document represented by a given parent non-leaf node of the identified given pair of child nodes,
        if the generated intermediate document is an intermediate XML document, transform the generated intermediate document using a second existing XSL document or a second generated intermediate XSL document represented by a sibling node of the given parent non-leaf node, and
        if the generated intermediate document is an intermediate XSL document, use the generated intermediate document to transform a second existing XML document or a second generated intermediate XML document represented by a sibling node of the given parent non-leaf node; and
    generate a final document with the computer based on said post-order traversal of the binary tree.

7. The non-transitory computer readable medium of claim 6, wherein the binary tree is represented using an XML format.

8. The non-transitory computer readable medium of claim 6, wherein the final document is a report.

9. The non-transitory computer readable medium of claim 6, wherein the final document is a web page.

10. The non-transitory computer readable medium of claim 6, wherein the intermediate document is generated on-the-fly during said post-order traversal.

\* \* \* \* \*